US008223730B2

(12) United States Patent
Hupp et al.

(10) Patent No.: US 8,223,730 B2
(45) Date of Patent: Jul. 17, 2012

(54) SYSTEM AND METHOD FOR THE MONITORING OF GROUPED OBJECTS

(75) Inventors: Jürgen Hupp, Nürnberg (DE); Volker Gehrmann, Erlangen (DE); Alexander Pflaum, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 916 days.

(21) Appl. No.: 11/883,022

(22) PCT Filed: Jan. 25, 2006

(86) PCT No.: PCT/EP2006/000642
§ 371 (c)(1),
(2), (4) Date: Oct. 3, 2008

(87) PCT Pub. No.: WO2006/079521
PCT Pub. Date: Aug. 3, 2006

(65) Prior Publication Data
US 2009/0213785 A1 Aug. 27, 2009

(30) Foreign Application Priority Data

Jan. 25, 2005 (DE) .......................... 10 2005 003 474
Aug. 12, 2005 (DE) .......................... 10 2005 038 244

(51) Int. Cl.
*H04W 4/00* (2009.01)
(52) U.S. Cl. ...................................................... 370/338
(58) Field of Classification Search ........................ None
See application file for complete search history.

(56) References Cited

U.S. PATENT DOCUMENTS

| 5,565,858 A | 10/1996 | Guthrie |
| 7,403,744 B2 * | 7/2008 | Bridgelall ..................... 370/338 |
| 7,479,877 B2 * | 1/2009 | Mortenson et al. ........ 340/545.6 |
| 7,652,568 B2 * | 1/2010 | Waugh et al. ............. 340/538.15 |

(Continued)

FOREIGN PATENT DOCUMENTS

CA 2285930 6/1942

(Continued)

OTHER PUBLICATIONS

International Search Report dated Jun. 6, 2006 issued in PCT/EP2006/000642.

(Continued)

*Primary Examiner* — Anh-Vu Ly
(74) *Attorney, Agent, or Firm* — Venable LLP; Robert Kinberg; Todd R. Farnsworth

(57) ABSTRACT

A system and a method for monitoring grouped objects with a gateway and a plurality of radio nodes attachable to the objects. Each radio node has a computing unit, a short-range communications unit and an energy supply unit. One of the radio nodes or the gateway has a localization unit. Optionally, one of the radio nodes also has a long-range communications unit. The computing unit contains a control program for the processing of predetermined tasks in radio nodes, which is designed for the control of bi-directional communications between the radio nodes via the short-range communications unit for the formation of an ad hoc network. The control program undertakes the control of a tuning process between the radio nodes and selects one of the radio nodes for the processing of one of the predetermined tasks, the selected node at that instant being best suited for the task according to predetermined criteria.

14 Claims, 1 Drawing Sheet

U.S. PATENT DOCUMENTS

| | | | |
|---|---|---|---|
| 7,664,081 B2 * | 2/2010 | Luoma et al. | 370/338 |
| 7,676,195 B2 * | 3/2010 | Ratiu et al. | 370/338 |
| 2003/0124979 A1 | 7/2003 | Tanada et al. | |
| 2004/0233041 A1 | 11/2004 | Bohman et al. | |
| 2005/0058108 A1 * | 3/2005 | Ekberg et al. | 370/338 |
| 2005/0248454 A1 * | 11/2005 | Hanson et al. | 340/539.26 |
| 2006/0267731 A1 * | 11/2006 | Chen | 340/10.1 |
| 2007/0150565 A1 * | 6/2007 | Ayyagari et al. | 709/223 |

FOREIGN PATENT DOCUMENTS

| | | | |
|---|---|---|---|
| EP | 1 246 094 A1 | 10/2002 | |
| EP | 1 324 540 A1 | 7/2003 | |
| EP | 1 406 207 A1 | 4/2004 | |
| WO | WO 98/48396 | 10/1998 | |

OTHER PUBLICATIONS

German Office Action dated Mar. 29, 2006 issued in DE 10 2005 038 244.4.

* cited by examiner

SYSTEM AND METHOD FOR THE MONITORING OF GROUPED OBJECTS

TECHNICAL FIELD OF APPLICATION

The present invention concerns a system and also a method for the monitoring of grouped objects, in particular of goods or transport containers (e.g. containers) in logistical systems, in which at least one gateway and a plurality of radio nodes attachable to the objects are introduced.

In logistical systems the flows of goods and information have up to now as a rule been insufficiently linked together. Wastage and theft in the distribution systems of the economy, out-of-stock situations in trade, fraud in the sale of jewelry and high-quality items of clothing, high and unmarketable remaining stocks in the food industry, and an often poor quality of the data in logistical information systems are the result. The use of accompanying documents, barcodes and RFID (Radio Frequency Identification) has only been able to solve these problems partially up to now.

BACKGROUND OF THE INVENTION

Figure 1:
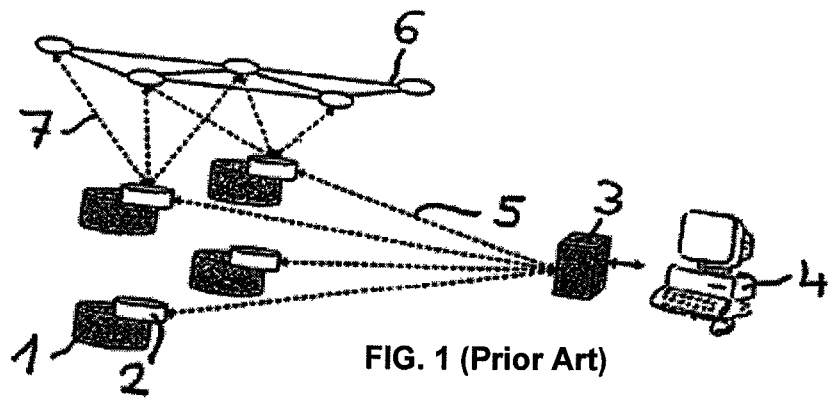

It is known in the art to monitor grouped objects in logistical systems by attaching simple transponders to the objects that are able to communicate via a remote gateway with a superordinate information system. FIG. 1 shows schematically a system of this kind with the transponders 2 fitted to the objects 1, the gateway 3 and also the information system 4. The connection between the transponders 2 and the gateway 3 takes place via a wireless medium. Communication 5 is indicated in the figure. With small distances and few requirements, thus, for example, in the identification of pallets and outer packagings with the aid of so-called smart labels, the transponders 2 do not make use of any kind of energy storage system and extract the energy necessary for communications 5 directly from a magnetic or electromagnetic field generated by a base station. However for larger distances between the transponders 2 and the gateway 3 batteries or accumulators are required for operation of the transponders 2 and communications 5. If the exact position of the logistical objects 1 is required in the information system 4, then each individual object 1 must undertake a determination of location with the aid of a suitable localisation infrastructure 6 and transmit the position data wirelessly to the gateway 3.

In a system of this kind numerous problems occur in which up to now have prevented any practical use in logistical systems. Thus the individual objects 1 can mask one another in terms of radio signals, so that undistorted communication with the gateway 3 and the 100% communications security required in many cases are no longer guaranteed. Likewise any localisation is prevented as a result of the masking of radio signals, for example, with the stacking of containers in a ship's hull if localisation should take place via a satellite navigation system. Since each individual object 1 must communicate with the gateway 3 over comparatively long distances, very high communications costs are generated, in particular in applications that are spatially very widely distributed. The use of energy storage systems repeatedly requires expensive maintenance processes during the service life in terms of replacing batteries or charging the accumulators. The energy reserve is in many cases too quickly exhausted from the point of view of the application.

For a seamless flow of information and goods it is necessary that object and information system can communicate at all times, the identity and the state of the individual object are known at all times in the information system, and the position of the object is likewise stored in an up-to-date manner in the data structures. It is true that this requirement can in principle be realised by the attachment of microelectronic modules, such as the active transponders already cited, onto the objects. However, in practice the widespread use of microelectronic modules of this kind is impeded by the high energy consumption already referred to above, together with a limited energy reserve.

SUMMARY OF THE INVENTION

An object of the current invention comprises specifying a system and also a method for the monitoring of grouped objects that is suitable for the monitoring of goods in logistical systems and requires a lower rate of maintenance.

This object is achieved with the system for the monitoring of grouped objects in logistical systems having at least one gateway and a plurality of radio nodes attachable to the objects and also the method for monitoring grouped objects with such a system Advantageous embodiments of the system can be extracted from the following description of embodiments of the invention.

According to one embodiment of the invention, there is provided a system comprising a plurality of novel radio nodes, which replace the simple electronic labels or transponders used up to now. The radio nodes are composed of a central computing unit, a short-range communication unit and also an energy supply unit required for the operation of the radio node, for example a battery or an accumulator. At least one of the radio nodes or the gateway includes a localisation unit. Furthermore at least one of the radio nodes optionally has a long-range communications unit.

A radio node is defined in this document as a microelectronic module that has the units described above. The short-range and long-range communications units are designed for wireless communication with other radio nodes of the system and a gateway belonging to the system. The definition of short-range communication in this application is hereby understood to include wireless transmission technologies such as, for example, Bluetooth or Zigbee; long-range communication defines a system that enables wireless communication over greater distances than short-range communication, for example by means of GSM or UMTS.

The radio nodes are fitted to the individual objects that are to be monitored. The computing unit in the radio node in question has at least one control program at its disposal for the processing of predetermined tasks in the radio node in question. The control program installed in the radio node enables bi-directional communication between the individual radio nodes via the short-range communications unit for the formation of an ad hoc network, and also between the radio nodes and the gateway via the short-range or long-range communications unit. Here the formation of the ad hoc network takes place via a suitable protocol. Self-networking radio networks with radio nodes of this kind are of known art from other sectors, in particular from the field of distributed sensor networks. As a standardised current-saving transmission protocol, for example, Zigbee, or TinyOS from the University of California, Berkeley, can be used within the radio network. Needless to say, however, other network protocols are also suitable for transmission within the radio network. If necessary utilisation of the long-range communications unit can also be introduced for one part of the bi-directional communications between the radio nodes for the formation of the ad hoc network. The gateway belonging to the system has likewise, as for the system of known prior art described in the introduction, the function of a base station, which provides the connection to the information system. This connection can take place both wirelessly and also in wired form. The role of the gateway can also be fulfilled by one of the radio nodes.

In the present system the control program is designed for the control of a tuning process between the radio nodes, in which one of the radio nodes is selected for the processing of one of the predetermined tasks, which node at that instant is best suited for the task according to predetermined criteria. This concerns primarily accommodation of the connection with the gateway, which preferably takes place from that one of the radio nodes, which at that instant has the greatest energy reserve or the best reception conditions. Here the tuning process between the radio nodes can be executed at prescribable time intervals, at prescribable times, and/or according to a requirement received via the gateway, and/or by an event detected by one of the radio nodes via an installed detection unit. With a requirement of this kind one can, for example, be dealing with a requirement for localisation information, or a command for the execution of a particular task.

In the present method for the monitoring of grouped objects the described system is introduced, in that the radio nodes are attached to the object and are initialised for the formation of ad hoc networks. By means of this networking of objects located near to one another a cluster is formed. Within this cluster in accordance with the tuning process in question the radio node, which according to predetermined criteria is best suited for the task in question, undertakes on behalf of all other radio nodes the execution of this task. Here one can be dealing with the maintenance of communication with the gateway, the determination of position via the localisation unit, or also other tasks. Thus in accordance with the tuning process the radio node with the greatest energy reserve can, for example, undertake the task of determining the position of the cluster on behalf of all other radio nodes, and in turn of passing on the result on behalf of all via the gateway to the information system. For most logistical applications the position of the cluster is sufficient. The exact position of each individual object within the cluster is only required in a few special cases, for example, for security against theft.

The present system and also the related method increase the transparency of the physical flows of goods in logistical systems. By means of the system the maintenance and operating costs of tracking and tracing systems working with transponders are reduced, and their technical performance, in particular the reading reliability, is improved, Thus the problem of masking of radio signals is solved by the small scale networking provided by the formation of the ad hoc network. In contrast to the systems working with transponders described in the introduction the reading reliability is considerably increased, since communications take place over shorter distances and no material penetration problems occur. By means of the clustering and movement of energy intensive processes, such as position determination and long-range communication, to the radio node that at that instant has access to the greatest energy reserves, the energy consumption in the overall system reduces considerably and evenly. The savings potential increases with the number of objects in the individual clusters. By means of this concept in which the radio nodes jointly solve the prevailing tasks, maintenance intervals are significantly extended, in particular with regard to the energy supply, so that process costs are reduced. The same applies also to the savings in communications costs by the movement of more expensive communications activities onto one radio node acting on behalf of all radio nodes.

In addition to the tasks previously cited, such as communication with the gateway node or position determination. Further tasks can, needless to say, also be dealt with by the individual radio nodes by implementation of software modules into the computing units. This applies, for example, to the recording of sensor data, if the radio nodes make use of appropriate sensors for the detection of an instantaneous state, such as temperature. Furthermore parts of logistical applications software can be moved onto the radio nodes in order to reduce in this manner the complexity of extended logistical information systems.

The system as well as the related method can be introduced for all grouped objects, i.e. objects arranged in spatial proximity, preferably, however, for goods in logistical systems. Here, for example, one can be dealing with the tracking of vehicles, of changeover containers and containers, of loading and transport appliances, of outer packagings, products and other logistical objects.

The present system can comprise various radio nodes, of which only one part has a long-range communications unit. In this case the task of long-range communication within a cluster is given in the tuning process to only one of the radio nodes, which has access to an appropriate unit. Furthermore instead of the energy reserve other criteria can, needless to say, also be called upon for the selection of the radio node suitable for the task in question within the cluster, for examples, the best reception quality for the connection with a gateway. By the renewed activation in each case of the tuning process for the different tasks at different times the individual tasks are not always solved by the same radio node, but rather in each case by that one node that is actually best suited at the point in time of the tuning process.

SHORT DESCRIPTION OF THE DRAWINGS

The present system and also the present method are in what follows briefly elucidated once again with the aid of an example of embodiment in conjunction with the drawings, without any limitation of the area of protection prescribed by the patent claims. In the figures FIG. 1 shows schematically an example of a system according to prior art.

Figure 2:
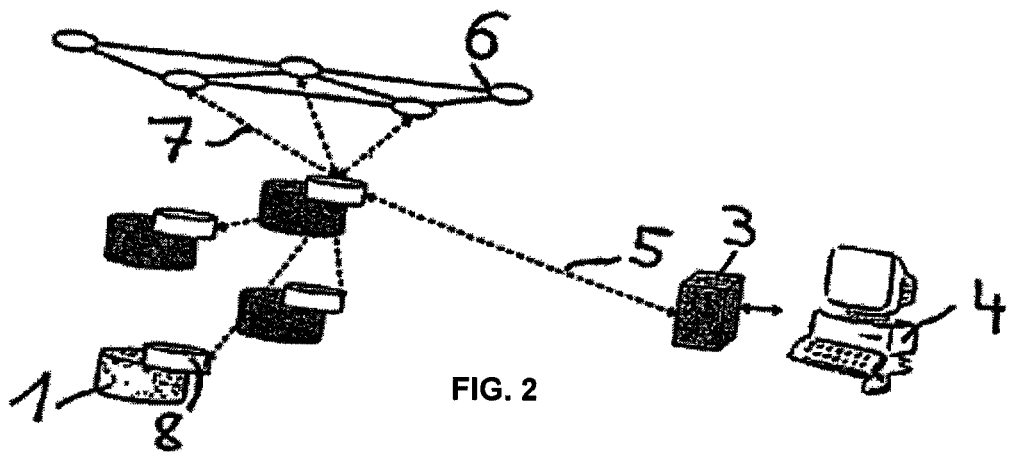
Figure 3:
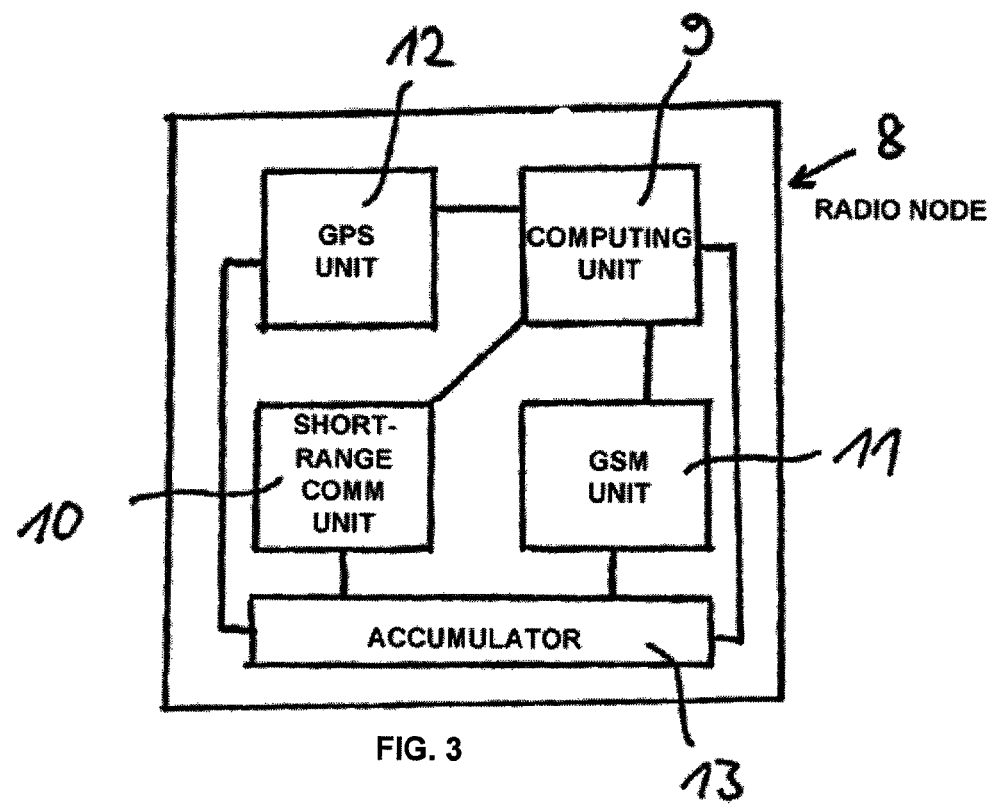

FIG. 2 shows schematically an example for the structure of the present system; and FIG. 3 shows schematically the structure of an individual radio node of the present system.

DETAILED DESCRIPTION

In the present embodiment, the system and the method are introduced for the management of empty swap trailers in logistical networks. Present day systems are available based on transponders in which the transponders consist of a GPS unit, a GSM unit and a computing unit. These transponders determine their position at fixed time intervals and forward the resulting location information to a central point. According to the one embodiment, the disposition of the swap trailers takes place according to the current needs in the overall system. However, high energy consumption, maintenance costs and communications costs inhibit widespread use of a system of this kind at the present time.

Since the swap trailers in depots, and on road and rail trains, remain relatively close to one another compared with the spatial compass of logistical systems, the present system can be introduced for a task of this kind. According to an embodiment of the invention, the present radio nodes are different from the transponders mentioned above, in that, as shown in the schematic of FIG. 3, in addition to a GPS unit 12 for localisation a radio node 8 has access to a GSM unit 11 for long-range communication and to a computing unit 9 via a short-range communications unit 10, for example a Bluetooth unit. An accumulator 13 for energy supply supplies energy to units 9-12.

These radio nodes are fitted to the swap trailers, which in the present example represent the objects that are to be monitored. The overall system is schematically shown in FIG. 2, in which the objects 1, together with the radio nodes 8, the gateway 3, and also the information system 4, can be recognised. The localisation infrastructure 6 for the localisation 7 of an individual radio node 8 is provided in the present example by existing GPS satellites. In this system the communication 5 with the gateway takes place in each case through only one of the radio nodes 8, which has previously been selected in bi-directional communication between the individual radio nodes 8 in a tuning process.

From the central point with the information system 4 the radio nodes 8 are requested to signal their position once per day by means of a message broadcast via the gateway 3. Each radio node 8 then accepts via the short-range communications unit 10 contact with possible neighbouring nodes. After a cluster formation by the networking of all accessible nodes there follows a tuning process in each of the clusters formed. The clusters can here originate in depots, rail and road trains. In the cluster the task is collectively given to the functional node with the greatest energy reserve of determining the position representative of the cluster with the aid of the integrated localisation unit, the GPS unit 12, and of reporting via the GSM unit 11 to the central information system 4. Here the disposition can then take place. Until the next message broadcast all radio nodes 8 change into standby operation. The energy saving effects can be considerable in a system of this kind. In particular for depots, which can contain clusters of 100 and more objects ones can count on considerable energy and cost savings.

The invention claimed is:

1. A system for monitoring objects within a group comprising:
   a plurality of radio nodes each of which is attached to a respective one of the objects in the group;
   at least one gateway that receives and transmits signals between the plurality of radio nodes and an information system,
   wherein each radio node has
      at least one computing unit,
      a short-range communications unit for wireless communication with other radio nodes of the plurality of radio nodes and with the at least one gateway, and
      an energy supply unit,
   wherein at least one of the radio nodes or the at least one gateway has a localization unit,
   wherein the computing unit contains at least one control program for processing predetermined tasks in the plurality of radio nodes, said control program controlling bi-directional communications between the plurality of radio nodes via the short-range communications unit for the formation of an ad hoc network and controlling bi-directional communications between the plurality of radio nodes and the at least one gateway via the short-range communications unit and controlling a tuning process between the plurality of radio nodes, said tuning process being executed at one of predetermined time intervals, predetermined times, according to a requirement received via the at least one gateway or by an event detected by one of the plurality of radio nodes in order to select one of the plurality of radio nodes for the processing of one of the predetermined tasks, where the selected radio node is best suited for the task according to predetermined criteria at the instant selection is made.

2. The system according to claim 1, wherein the control program for the control of the tuning process selects the radio node with the largest energy reserve for communication with the gateway as a predetermined task.

3. The system according to claim 1, wherein the control program for the control of the tuning process selects the radio node with the best reception conditions for communication with the gateway as a predetermined task.

4. The system according to claim 1, wherein the control program for the control of the tuning process selects the radio node with the largest energy reserve for determination of a position with the localization unit as a predetermined task.

5. The system according to claim 1, wherein the control program for the control of the tuning process selects the radio node with the best reception conditions for determination of a position with the localization unit as a predetermined task.

6. The system according to claim 1, wherein the group of objects to be monitored are goods in a logistical system.

7. The system according to claim 1, wherein the control program contains modules for the processing of logistical tasks.

8. The system according to claim 1, wherein one of the plurality of radio nodes comprises the at least one gateway.

9. The system according to claim 1, wherein each radio node of the plurality of radio nodes has detection units for the monitoring of the objects.

10. The system according to claim 1, wherein at least one of plurality of radio nodes has a localization unit and at least one of the radio nodes has a long-range communications unit where the control program of the computing unit controls bi-directional communications between the plurality of radio nodes and the at least one gateway via the long-range communications unit.

11. The system according to claim 1, wherein at least one of plurality of radio nodes has a localization unit and at least one of the radio nodes has a long-range communications unit where the control program of the computing unit controls bi-directional communications between radio nodes and the at least one gateway via one of the short-range communications unit or the long-range communications unit.

12. A method for monitoring objects within a group with a system according to claim 1, said method comprising:
   attaching each of the radio nodes to a respective one of the objects in the group;
   initializing the radio nodes attached to the respective objects to form an ad hoc network;
   selecting a radio node by the tuning process of the system at one of predetermined time intervals, predetermined times, according to a requirement received via the at least one gateway, or by an event detected by one of the plurality of radio nodes to determine a position of the radio node; and
   transmitting the determined position of the radio node either directly or via one or a plurality of other radio nodes of the system to the at least one gateway.

13. The method according to claim 12, wherein the plurality of objects formed in a group are goods in a logistical system.

14. The method according to claim 12, wherein after initializing the radio nodes for the formation of an ad hoc network, selecting a radio node of the ad hoc network by the tuning process so that the position of the radio node can be determined, and then the determined position is sent either directly or via at least one of the plurality of the other radio nodes to the gateway.

* * * * *